June 19, 1928.

W. T. POWELL 1,674,298

ALTERNATING CURRENT RECTIFIER

Filed July 28, 1925

INVENTOR
WINFRED T. POWELL

BY D. Clyde Jones

ATTORNEY

Patented June 19, 1928.

1,674,298

UNITED STATES PATENT OFFICE.

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK.

ALTERNATING-CURRENT RECTIFIER.

Application filed July 28, 1925. Serial No. 46,675.

This invention relates to devices for rectifying alternating current and more particularly to such devices which rectify alternating current from a commercial source for supplying space current in the output circuit of one or more thermionic tubes.

It has been proposed to employ one rectifying device to rectify alternating current in which case only one half of the wave is rectified since the other half is disregarded. It has also been proposed to employ two thermionic rectifying devices arranged in circuits by which one device rectifies one half of the wave and the other device rectifies the other half.

In accordance with the present invention it is proposed to employ a single rectifying device of the unidirectional type and at the same time utilize both halves of the alternating current waves.

Another feature of the invention resides in the provision of means for rectifying the alternating current, which is inexpensive to manufacture, simple to maintain in operation and which eliminates alternating current noises.

Figure 1:
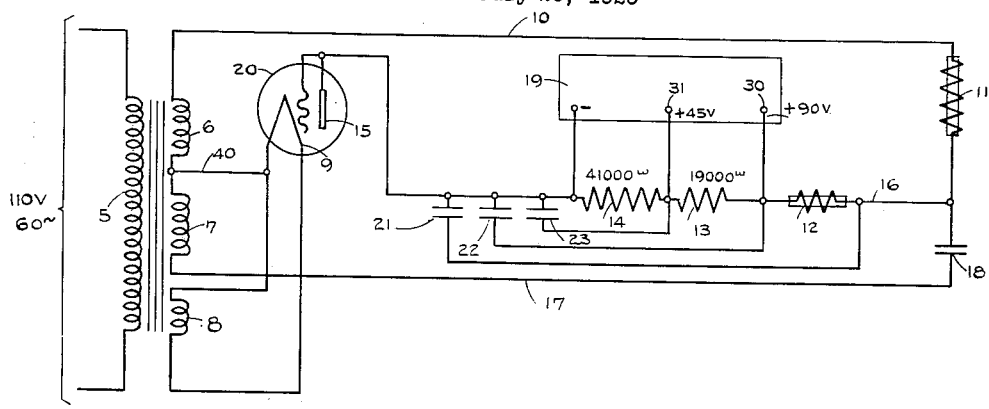
Figure 2:
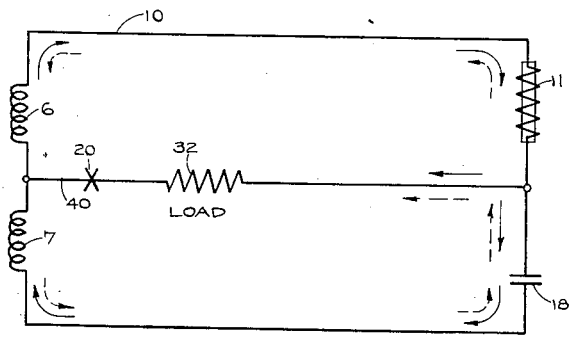

Referring to the drawings, Fig. 1 shows a circuit arrangement of the rectifying device of this invention, while Fig. 2 shows a simplified schematic arrangement of the same.

For a more complete understanding of the invention, reference is made to Fig. 1, in which there is represented a commercial source of 110 volts, 60 cycle alternating current such as is derived from the commercial lighting circuit. The circuit includes the primary winding 5 of an iron core transformer, which has a secondary winding tapped at its mid-point to provide two portions herein designated 6 and 7. A second winding 8 of this transformer furnishes heating current for the filament 9 of the thermionic rectifying tube 20. From the mid-point of the first-mentioned secondary winding, a conductor 40 is connected to one side of the filament heating circuit. The upper terminal of winding 6 is connected by means of conductor 10 through the choke coil 11, thence through a second choke coil 12 and resistance units 13 and 14 to the anode 15 of the rectifying tube. The lower terminal of winding 7 is connected to the anode 15 through conductor 17 and condenser 18. The rectangle designated 19 represents a multi-tube radio receiving set, in which the highest plate potential is applied at 30, and an intermediate voltage at 31. The resistance units 13 and 14 insure that space current of the proper voltage is supplied to the several terminals of the radio receiving set.

The operation of this rectifying system will be understood from Fig. 2, in which corresponding parts are indicated by the same reference characters. For the purpose of simplifying the description and referring to the schematic circuit of Fig. 2 the coils 6 and 7 may be regarded as two alternating current generators connected in series. If condenser 18 of Fig. 2 should be replaced by a coil similar to 11, then there would be shown a three-wire circuit with the load present in the neutral branch of the system, but under such conditions no current would flow through the load circuit. However, with condenser 18 as shown in the figures and with a unilateral rectifying device, such as the thermionic tube 20, currents will flow as shown by the full line and dotted line arrows. When the upper terminals of coils 6 and 7 are positive, current flows through conductor 10, choke coil 11 and divides, a portion of which flows through the load 32 and the other portion of which charges the condenser 18. It is to be noted that at this time current in the lower branch, represented by the full line arrows, will not flow through the center branch, because of the one-way characteristic of rectifier 20. When the upper terminals of coils 6 and 7 are negative, current flows as shown by the dotted line arrows through the load in the same direction as before and since it is of the opposite polarity from that which charged the condenser 18, this last condenser will discharge and add to the current flow of this half cycle. At this time current in the upper branch, represented by the dotted line arrows, will not flow through the center branch, because of the one-way characteristic of rectifier 20. The high impedance of the coil 11 prevents a great deal of current from flowing through the upper branch during this half of the cycle including conductor 10. With each succeeding cycle the flow of current through the load as just described, is repeated.

The sixty thousand ohm resistance including the coils 13 and 14 is for the purpose of obtaining a voltage drop of 45 volts for use on the detector and also serves the purpose of keeping the voltage down when the receiver is not turned on.

The choke coil 12 offers high impedance to the alternating current component, which would tend to flow through the resistance elements 13 and 14, while the condenser 21 serves to by-pass a portion of this current around the mentioned elements. A second condenser 22 serves to by-pass about the resistance elements any alternating current component, which has passed through the choke coil 12, while the condenser 23 serves to by-pass any remaining alternating current about the resistance unit 14. The condensers 21, 22 and 23 together with the choke coil 12 serve as a filter to eliminate disturbing current noises, which have commonly been referred to as the alternating current hum.

It will thus be seen that an improved rectifying device, in which one rectifying element serves to rectify both halves of the alternating wave, is provided.

What I claim is:

1. The method of converting alternating current into direct current by means of a rectifying device having a single rectifying path, which consists in supplying one half cycle of said alternating current to said device and to a capacity in parallel, and supplying the succeeding half cycle of said alternating current to said capacity and rectifying device in series.

2. The method of converting alternating current into direct current by means of a network including a rectifying device having a single rectifying path, which consists in supplying one half cycle of said alternating current to said rectifying device and capacity in parallel, supplying the succeeding half cycle of said alternating current to said rectifying device and capacity in series, and employing an impedance to insure the passage of said last mentioned half cycle of said alternating current through the rectifying device and capacity in series relation.

3. The method of converting alternating current into direct current by means of a thermionic device having a single path for space current which consists in supplying one half cycle of said alternating current to said rectifying device and a capacity in parallel, and supplying the succeeding half cycle of said alternating current to said rectifying device and capacity in series.

4. A method of converting alternating current to direct current by means of a thermionic device having a single path for space current which consists in supplying one half cycle of said alternating current to said rectifying device and a capacity in parallel, supplying the succeeding half cycle of said alternating current to said rectifying device and capacity in series, and employing an impedance to insure the passage of said last mentioned half cycle of said alternating current through the rectifying device and capacity in series relation.

5. In a system of the class described, a source of alternating current, a transformer having its primary winding connected in series with said source of current, a secondary winding for said transformer, a circuit including a choke coil and a condenser connecting the ends of said secondary winding, a uni-directional conducting device and a load connected in series between a point on the circuit intermediate said coil and said condenser and an intermediate point on said secondary winding.

6. In a system of the class described, a source of alternating current, a transformer having its primary winding connected in series with said source of current, a secondary winding for said transformer, a circuit including a choke coil, and a condenser connecting the ends of said secondary winding, and a thermionic rectifying device and a load connected in series between a point on the circuit intermediate said coil and said condenser and an intermediate point on said secondary winding.

7. In a system for converting alternating current into direct current, a source of alternating current, a transformer having its primary winding connected in circuit with said source of current, a secondary winding for said transformer, a circuit including a choke coil and a condenser connecting the ends of said winding, and a conducting path including a rectifying device, resistance units, and a choke coil in series, said path extending from an intermediate point on said secondary winding to a point on the circuit between said first mentioned choke coil and condenser.

8. In a system for converting alternating current into direct current, a source of alternating current, a transformer having its primary winding connected in circuit with said source of current, a secondary winding for said transformer, a circuit including a choke coil and a condenser connecting the ends of said winding, a conducting path including a rectifying device, resistance units, and a choke coil in series, said path extending from an intermediate point on said secondary winding to a point on the circuit between said first mentioned choke coil and condenser, and a filter arrangement connected across said resistance units.

9. In a system for converting alternating current into direct current, a source of alternating current, a coil, means for introducing said alternating current into said coil, a circuit including a choke coil and a capacity connecting the ends of said first mentioned coil, a conductor including a rectifying device and a choke coil connected to an intermediate point on said first mentioned coil and to a point on said first mentioned circuit between said first choke coil and capacity, a by-pass condenser about said second choke coil, and means for transferring energy from said conductor to a work circuit.

10. In a system for converting alternating current into direct current, a source of alternating current, a coil, means for introducing said alternating current into said coil, a circuit including a choke coil and a capacity connecting the ends of said first mentioned coil, a conductor including a rectifying device, a resistance unit, and a second choke coil connected to an intermediate point on said first mentioned coil and to a point on said first mentioned circuit between said first choke coil and capacity, a by-pass condenser about said resistance unit and said choke coil, and means for transferring energy from said conductor to a work circuit.

In witness whereof, I hereunto subscribe my name this 25th day of July A. D. 1925.

WINFRED T. POWELL.